(12) United States Patent
Gleasman et al.

(10) Patent No.: US 6,783,476 B2
(45) Date of Patent: Aug. 31, 2004

(54) COMPACT FULL-TRACTION DIFFERENTIAL

(75) Inventors: Vernon E. Gleasman, Pittsford, NY (US); Keith E. Gleasman, Fairport, NY (US)

(73) Assignee: Torvec, Inc., Pittsford, NY (US)

( * ) Notice: Subject to any disclaimer, the term of this patent is extended or adjusted under 35 U.S.C. 154(b) by 0 days.

(21) Appl. No.: 10/425,330

(22) Filed: Apr. 29, 2003

(65) Prior Publication Data

US 2004/0132574 A1 Jul. 8, 2004

Related U.S. Application Data

(60) Provisional application No. 60/437,806, filed on Jan. 3, 2003.

(51) Int. Cl.[7] .............................................. F16H 48/06
(52) U.S. Cl. ......................... 475/227; 475/344; 74/458
(58) Field of Search ................................ 475/227, 344; 74/458

(56) References Cited

U.S. PATENT DOCUMENTS

| | | | | |
|---|---|---|---|---|
| 2,022,141 | A | * 11/1935 | Porter | 475/227 |
| 2,859,641 | A | 11/1958 | Gleasman | 74/715 |
| 3,735,647 | A | 5/1973 | Gleasman | 74/715 |
| 3,849,862 | A | 11/1974 | Benjamin | 29/407 |
| 3,875,824 | A | 4/1975 | Benjamin | 74/715 |
| 3,884,096 | A | 5/1975 | Gleasman | 74/715 |
| 4,191,071 | A | 3/1980 | Gleasman et al. | 74/715 |
| 4,724,721 | A | * 2/1988 | Gleasman et al. | 475/160 |
| 4,776,235 | A | 10/1988 | Gleasman et al. | 74/720.5 |
| 4,878,400 | A | * 11/1989 | Kimura et al. | 475/227 |
| 4,907,672 | A | * 3/1990 | Muzzarelli | 180/233 |
| 4,926,712 | A | * 5/1990 | Stritzel | 475/227 |
| 5,030,185 | A | * 7/1991 | Kawamura | 475/227 |
| 5,067,934 | A | * 11/1991 | Sato | 475/227 |
| 5,112,284 | A | * 5/1992 | Dye | 475/228 |
| 5,195,934 | A | * 3/1993 | Ichiki et al. | 475/227 |
| 5,232,415 | A | * 8/1993 | Brewer et al. | 475/227 |
| 5,338,267 | A | * 8/1994 | Takahashi et al. | 475/227 |
| 6,148,683 | A | 11/2000 | Fleytman | 74/425 |
| 6,582,338 | B1 | * 6/2003 | Fleytman | 475/227 |

FOREIGN PATENT DOCUMENTS

| DE | 3927072 A1 | * 3/1990 | F16H/01/38 |
|---|---|---|---|
| JP | 02283942 A | * 11/1990 | F16H/01/38 |

OTHER PUBLICATIONS

"Different types of 4WD, 1) Torsen differential—Audi Quattro system", Autozone Technical School —Traction, autozone.kyul.net/technical_school/traction/4wd_)2.htm, Feb. 10, 2003, pp. 1–2.

"American National Standard Gear Nomenclature—Terms, Definitions, Symbols, and Abbreviations", AGMA 112.05, Jun. 1976, pp. 1–2.

"Revolutionary Planetary Gearing Concept", Powertransmission.com, Feb. 08, 2003, pp. 1–2.

* cited by examiner

Primary Examiner—Charles A. Marmor
Assistant Examiner—David D. Lee
(74) Attorney, Agent, or Firm—Brown & Michaels, PC; Eugene Stephens & Associates

(57) ABSTRACT

The size, weight, and cost of a full-traction differential are significantly reduced by the synergism of several interrelated design features of a cartridge-like gear complex: (1) Each combination gear has only a shallow journal hole in each end of an otherwise solid gear body, being supported on mating hubs fixed to mounting plates slipped into a one-piece differential housing. (2) The solid worm-wheel portion of the combination gears has a deeper hour-glass shape. (3) Mating worm/worm-wheel teeth have a broad "supra-enveloping" contact pattern on only the drive side of the mesh. (4) The side-gear worms have closed-end teeth. (5) Both diameter and axial length of the side-gear worms are reduced by a special cutting process. The efficiency of the differential is increased by a thrust plate supported in the mounting plates and positioned between inner ends of the side-gear worms.

18 Claims, 9 Drawing Sheets

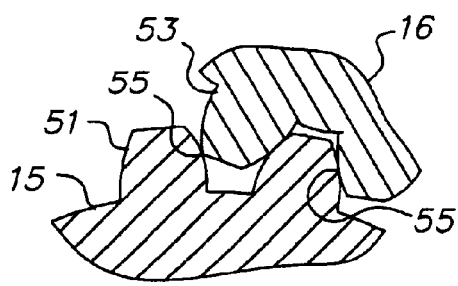
FIG. 6
(PRIOR ART)
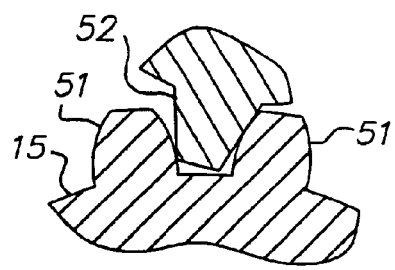
FIG. 5
(PRIOR ART)
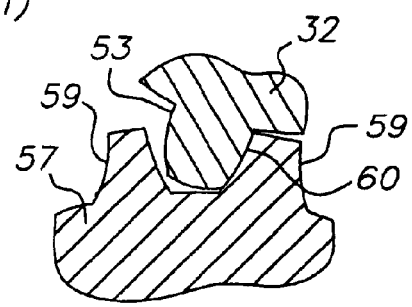
FIG. 7
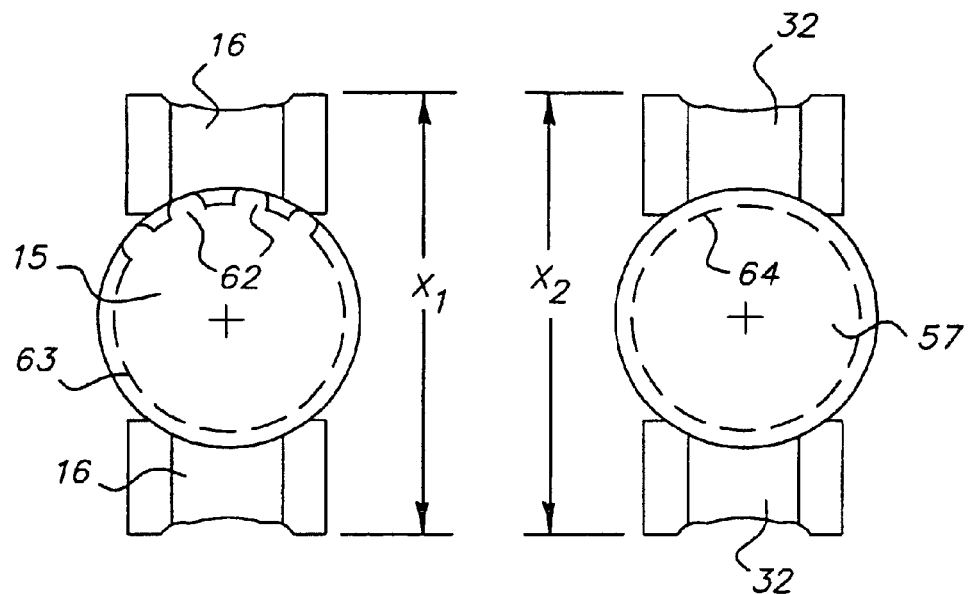
FIG. 8
(PRIOR ART)
FIG. 9

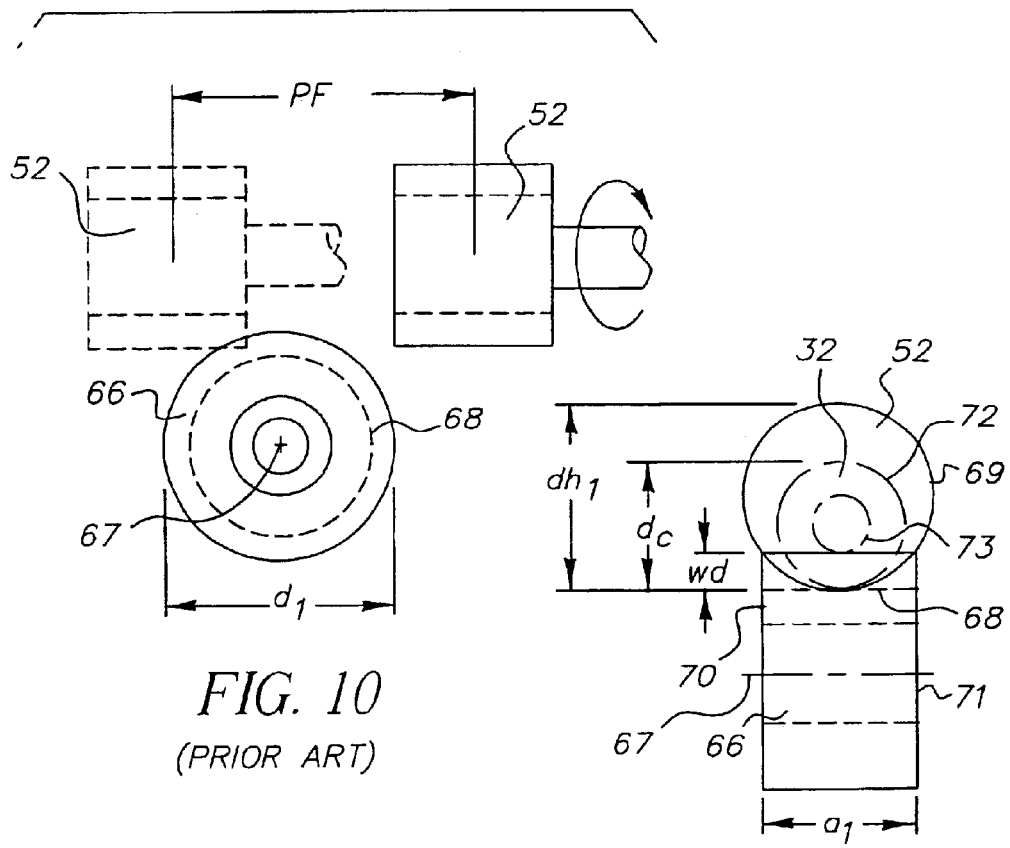
FIG. 10 (PRIOR ART)
FIG. 11 (PRIOR ART)
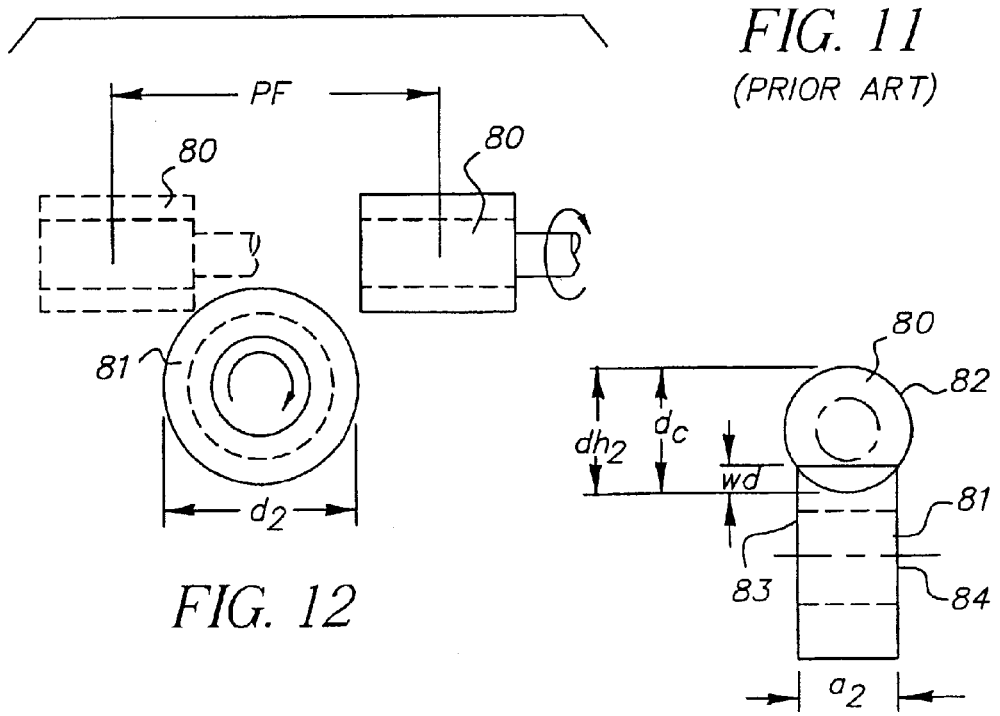
FIG. 12
FIG. 13

COMPACT FULL-TRACTION DIFFERENTIAL

This application claims the benefit of U.S. Provisional Application No. 60/437,806, filed on Jan. 3, 2003, which Provisional application is incorporated by reference herein.

TECHNICAL FIELD

This invention relates to all-gear differentials of the type commonly referred to as "limited-slip" designed primarily for automotive use and, more particularly, to such differentials designed for use in vehicles where efficiency, space, cost, and weight are critical.

BACKGROUND

The general format and operation of the type of differential being improved by the present invention is well known, and this prior art type of differential has enjoyed fairly widespread use and publicity throughout the world under the trademark "TORSEN®".

As is shown in FIG. 1, a prior art limited-slip differential of the type just mentioned above includes a rotatable gear housing 10, and a pair of drive axles 11, 12 are received in bores formed in the sides of housing 10. A flange 13 is formed at one end of housing 10 for mounting a ring gear (not shown) for providing rotational power from an external power source, e.g., from a vehicle's engine. The prior art gear arrangement within housing 10 is often called a "crossed-axis compound planetary gear complex" and includes (a) a pair of side-gear worms 14, 15 fixed, respectively, to the inner ends of axles 11, 12, and (b) several sets of combination gears 16 organized in pairs, each combination gear having outer ends formed with integral spur gear portions 17 spaced apart from a "worm-wheel" portion 18. [NOTE: While standard gear nomenclature uses the term "worm-gear" to describe the mate to a "worm," this often becomes confusing when describing the various gearing of an all-gear differential. Therefore, as used herein, the mate to a worm is called a "worm-wheel".]

Each pair of combination gears 16 is mounted within slots or bores formed in the main body of housing 10 so that each combination gear rotates on an axis that is substantially perpendicular to the axis of rotation of side-gear worms 14, 15. In order to facilitate assembly, each combination gear 16 usually has a full-length axial hole through which is received a respective mounting shaft 19 for rotational support within journals formed in housing 10. [NOTE A few known prior art combination gears were formed with integral hubs that are received into the journals of housing 10; but to facilitate design of the housing and assembly, the combination gears of most presently used limited-slip differentials of this type are shaft mounted.] The spur gear portions 17 of the combination gears 16 of each pair are in mesh with each other, while the worm-wheel portions 18 are, respectively, in mesh with one of the side-gear worms 14, 15 for transferring and dividing torque between axle ends 11, 12. In order to carry most automotive loads, prior art differentials of this type usually include three sets of paired combination gears positioned at approximately 120° intervals about the periphery of each side-gear worm 14, 15.

While the conventional full-length axial hole through each combination gear 16 (for receiving mounting shaft 19) facilitates assembly, it creates definite limitations and problems regarding the manufacture of combination gear 16. First, and most obvious, combination gear 16 is often measurably weakened by the full-length axial hole. Also, the hole places a limitation on the depth of the gear teeth formed on the cylindrical surfaces of the gear, particularly on the depth of the teeth on worm-wheel portion 18. Further, during necessary heat treatment for hardening the teeth formed on the cylindrical surfaces of combination gear 16, the full-length axial hole for receiving mounting shaft 19 must often be "masked" to reduce potential heat distortions of the teeth caused by the relatively thin wall that is created at the bottom lands of the worm-wheel teeth.

The tooth contact patterns of most known worm/worm-wheel combinations are conventional "single-enveloping" patterns. [NOTE: While not appropriate for this use, certain machine tool worm/worm-wheel combinations have "double-enveloping" tooth contact patterns. However, these require the use of hourglass worms mated with fully conjugate worm-wheels of greater diameter, while the full-traction differentials of the invention, as will be explained below, are designed with cylindrical worms mated with hourglass worm-wheels of smaller diameter.] Single-enveloping worm/worm-wheel combinations are known to mesh with a "line contact" in a relative "screw-like" motion (as different from the rolling engagement of spur or helical teeth), and the same line contact pattern is shared by the side-gear worms and the worm-wheel portions of the combination gears in prior art crossed-axis limited-slip differentials. Line contact, particularly when experienced in the relative "screwing" motion of worm gearing, tends to squeeze lubricant off tooth surfaces and, therefore, necessitates the use of fairly viscous lubricants to prevent galling.

This type of prior art limited-slip differential also has another disadvantage. An undesirable torque imbalance occurs whenever the vehicle's engine is applying torque to the differential. This results from the fact that the helical side-gear worms have the same helix angle and are, in effect, in sliding contact with each other at all times so that, when under load, both are subject to thrust forces in the same direction (e.g., both are simultaneously thrust to the left when the vehicle is being driven forward or simultaneously thrust to the right when the vehicle is driven in reverse). For instance, when subjected with thrust force X directed to the left, the right worm presses against the left worm with the force of X, while the left worm is pressed against its respective thrust bearing with a force of 2X. Since the differential divides the torque between the two axles, and since the torque distribution is affected by the friction overcome in each leg of the division, the just-described imbalance affects the torque bias of the differential. The following exaggeration may help to explain the effects of this imbalance: If the torque bias of the differential is designed for 8-to-1 (i.e., eight times more torque being directed to the slower moving wheel), when turning in one direction, the just-described imbalance might result in a torque bias of 10-to-1; and while turning in the opposite direction, the just-described imbalance might result in a torque bias of 6-to-1. While the prior art uses washers and bearings with low-friction surfaces to reduce the imbalance, it would be preferable for vehicle handling and maneuverability to totally avoid such thrust duplication between the side-gear worms.

Nonetheless, in actual practice, this type of prior art differential does a remarkable job of preventing undesirable wheel slip under most conditions. In fact, one or more of these limited-slip differentials are either standard or optional on vehicles presently being sold by at least eight major automobile companies throughout the world, and there are two of these TORSEN® limited-slip differentials in every U.S. Army HMMWV ("Hummer") vehicle (one differentiating between the front wheels and the other between the rear wheels). Nonetheless, these differentials are relatively large and heavy, taking up valuable space in the mechanically crowded modern vehicle; and they add fuel-consuming extra pounds to the vehicle's weight.

The invention herein is a significantly more compact "full-traction" differential that avoids the thrust duplication between the side-gear worms, is smaller in both size and weight, and is less costly to manufacture while meeting similar load-carrying specifications. [Prior art TORSEN differentials are presently commonly referred to as "limited-slip", and almost all of the TORSEN differentials presently being manufactured and sold are designed with relatively low torque bias ratios, no greater than 5-to-1. While the invention disclosed herein can be designed with torque bias in that same range, it is preferably designed for torque bias ratios greater than 5-to-1. Therefore, the term "full-traction" is used herein to distinguish the differentials of the invention.]

SUMMARY OF THE INVENTION

A cartridge-like gear complex is disclosed for use in a full-traction differential, and it differs from the prior art in several interrelated structural and design features. Each feature by itself provides some improvement inefficiency and/or some reduction in size and weight when compared with prior art limited-slip differentials having similar load-carrying specifications. However, when these several interrelated features are combined in a single differential, there is a synergistic effect that meets automotive specifications with greater efficiency, with significant weight reduction, and in a remarkably compact housing.

While these various synergistic features are all related, understanding is facilitated by introducing and explaining them individually.

The first feature is a basic change in the format of the combination gears and their respective mountings. In place of either the prior art's through hole for receiving a journal pin or the earlier prior art integral hub at each end, each combination gear of the invention has only a relatively shallow journal hole in each end of an otherwise solid gear body. (Note: As used herein, the term "shallow hole" refers to a hole that has a depth that is, at most, only a little larger than its diameter.) A mounting for supporting the sets of paired combination gears is provided with a plurality of sets of paired hubs fixed to the mounting and positioned, respectively, to extend axially into the shallow journal holes formed in the ends of each combination gear. By itself, the incorporation of this mounting arrangement reduces the outer diameter and overall weight of the differential without requiring any change in the load-carrying specifications for either the spur gear teeth or the worm-wheel teeth of the combination gears or the worm teeth of the side gears.

The just-described format change of this first feature also reduces manufacturing costs by (a) avoiding the manufacture of conventional independent journal shafts (that must be heat treated and ground) as well as the drilling of accurate holes within the housing for both the journal shafts and their necessary lock pins, and by (b) making the combination gears without the time and expense of masking. This first feature also simplifies assembly by avoiding the time and costs that would otherwise be required for the manual assembly of the multiple parts necessary for supporting each conventional combination gear.

The solid central portion of each combination gear, provided by the just-described first feature, leads to a further size and weight reduction feature. Namely, the solid central worm-wheel portion of each combination gear can be designed with a deeper hour-glass shape (e.g., by using a hob having the same outside and pitch diameters as the side gear) without jeopardizing strength.

A second feature of the invention comprises a different tooth design for the differential's worm/worm-wheel gearing. The tooth surfaces of the worm/worm-wheel gearing in known limited-slip differentials are involute in shape, being cut with straight-sided hob teeth and, as indicated above, have line contact. However, according to this second feature, only the worm-wheel portions of the combination gears retain this involute shape, while the side gears are cut with involute cutters and thus have an "inverse-involute" shape. In contrast to the line contact of the prior art, the respective involute and inverse-involute surfaces according to the invention mate with each other in a relatively broad "supra-enveloping" contact pattern on only the drive side of the mesh.

This just-described supra-enveloping contact pattern spreads the load over such a significantly wider area that it is possible to use only two pairs of combination gears (spaced, respectively, at 180° intervals) rather than the more conventional three pairs (spaced, respectively, at 120° intervals) to carry a given load. That is, this improved tooth design creates greater areas of tooth engagement as well as increasing the number of teeth in contact at any given time, making it possible to meet automotive specifications with two fewer gears. [Of course, this same new gearing can make it possible to carry significantly greater loads with the conventional three pairs of combination gears, and separate embodiments of the invention are disclosed for such three-pair designs.]

Also, as different from conventional line contact that concentrates the load, the supra-enveloping contact of this new gearing spreads the load over a relatively larger area and results in less shearing of the lubricating oil film, thereby permitting the use of lower viscosity lubricants and assuring longer part life.

A further note regarding the preferred design of the invention's worm/worm-wheel teeth: A salient feature of the crossed-axis gear complex of high-traction differentials is the mechanical advantage resulting from the worm/worm-wheel combination in the gear train between the vehicle's wheels and the differential. As a vehicle travels around curves, the weight and inertia of the vehicle cause the wheels to roll simultaneously over the surface of the road at varying speeds, resulting in the need for differentiation. The initiation of such differentiation is greatly enhanced by a mechanical advantage between the side-gear worms and their mating worm-wheels. Of course, this same gearing results in mechanical disadvantage when torque is being transferred in the opposite direction. The preferred embodiments of the invention select 35°/55° for the worm/worm-wheel teeth to provide both full traction as well as relative ease of differentiation, a selection that also makes the invention particularly appropriate for vehicles including ABS (automatic braking systems) having traction controls.

In another feature, the invention's different tooth design also includes side-gear worms having "boxed" (closed-end) teeth. [NOTE: Ample working depth is provided by cutting teeth using face hobs having a reduced diameter.] The boxed tooth ends permit the side-gear worm teeth to be designed with greater working depth, thereby also permitting a reduction in the diameter of the side-gear worms without loss of load-carrying ability. At the same time, the supra-enveloping contact permits the axial length of the side gears to be smaller, carrying the same loads in spite of their reduced size. In a preferred embodiment of the invention, both the diameter and axial length of the cylindrical side-gear worms are considerably reduced by cutting the worm teeth with a hob having approximately the same relatively small diameter as the worm-wheel portion of the combination gears, resulting in deeper boxed teeth on the side-gear worm.

A still further feature provides torque balancing that equalizes the end thrust on the respective side-gear worms during vehicle turning, when being driven in either forward or reverse, regardless of the direction of travel. A thrust plate is supported by the same mounting that supports the sets of paired combination gears, being fixed against lateral movement and maintained between the inner ends of the side-gear worms. Thus, when under thrust to the left, the right worm exerts a thrust force X against the thrust plate, and the left worm exerts only its own thrust force X against the housing rather than the 2X force as explained above in the Background portion of this specification. Similarly, when under thrust to the right, the left worm exerts a thrust force X against the thrust plate, and the right worm exerts only its own thrust force X against the housing. In one disclosed embodiment, the thrust plate is also used to pilot the side-gear worms and, thus, the inner ends of the axles.

As suggested above, the just-described structural and design features, when combined, have several synergistic effects, including: (1) For a given load, the number of combination gear pairs can be reduced from three to two. (2) The housing, including the two bearing portions that receive the axle journals, can not only be made smaller but can be formed in one piece. (3) A single additional rectangular hole is formed through the one-piece housing, permitting assembly without the additional cost of bolting on a separate cap. (4) The mounting for the combination gears, as just described above, can be readily fitted within the rectangular hole in the housing, being piloted and supported by the side-gear worms and axles. (5) The housing can be made with an appreciably smaller diameter without reducing the size (and strength) of the load-bearing segments connecting with the ring gear mount. (6) Further, it should be noted that the preferred embodiment just referred to above (with stronger and deeper teeth and the reduction of both the diameter and axial length of the cylindrical side-gear worms) results in additional reductions in the length as well as the diameter of the housing. (7) Finally, the efficiency of the differential is improved by the thrust plate supported by the same mounting as the combination gears.

The automobile industry seeks constant product improvement and places a premium on cost, weight, and size reduction. In addition, we live in a world with a dwindling supply of raw materials which must be conserved. The invention herein serves all of these needs by providing drivers with a full-traction differential that facilitates safe automotive handling in a more compact, more efficient, and less expensive format without sacrificing strength or durability.

DRAWINGS

Figure 4:
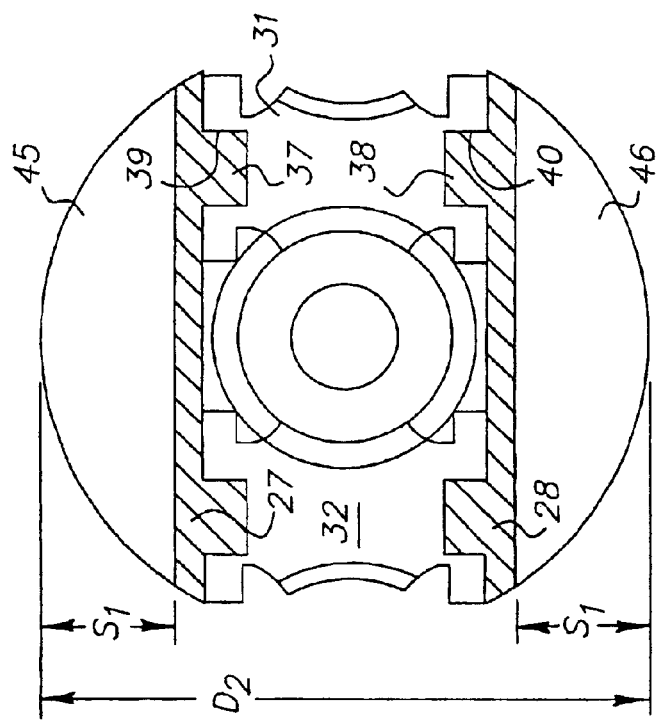
Figure 3:
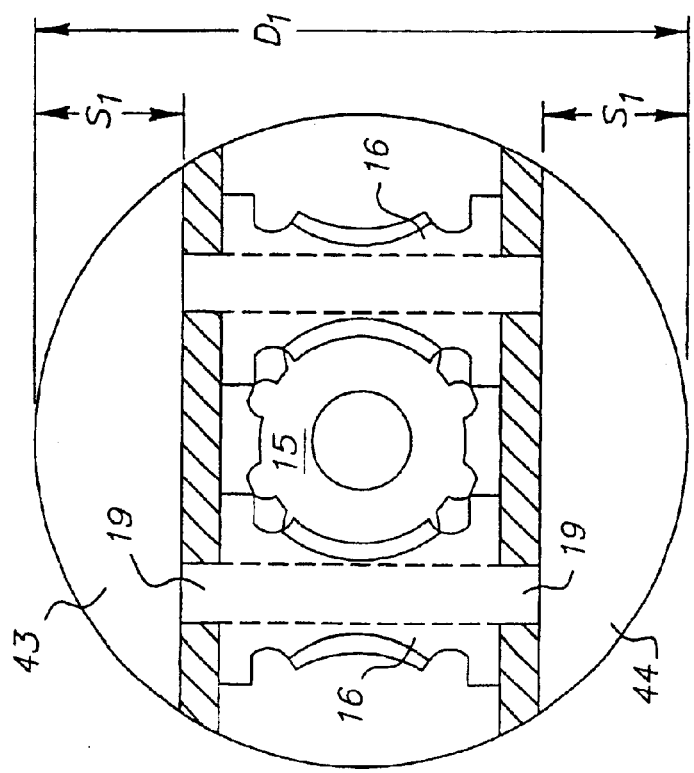
FIG. 3 is a schematic partially cross-sectioned side view of a segment of a prior art full-traction differential, showing the relative dimensions of the housing segment, a side-gear worm, and the mounting for the combination gears.

FIG. 4 is a schematic partially cross-sectioned side view of a segment of a full-traction differential according to the invention, in the same scale as FIG. 3, showing side-gear worms and combination gears having the same specifications as the prior art side-gear worms and combination gears shown in FIG. 3, and indicating that the size of the housing segment remains substantially the same, while the overall diameter of the housing is reduced.

FIG. 5 is a schematic cross section and segmental side view representing an involute-shaped tooth of a prior art side-gear worm being cut with a straight-sided hob.

FIG. 6 is a schematic cross section and segmental side view of a prior art side-gear worm/worm-wheel mesh, each having involute teeth, and indicating the line contacts between the meshing teeth.

FIG. 7 is a schematic cross section and segmental side view of a side-gear worm according to the invention, representing a pair of inverse-involute teeth being cut with a involute-sided hob and, at the same time, schematically representing the meshing contact between these same inverse-involute teeth and an involute tooth of the worm-wheel portion of a mating combination gear.

FIG. 8 is a schematic representation of a prior art side-gear worm in mesh with three sets of combination gears (only two sets shown, being rotated to a 180° spacing for clarity).

FIG. 9 is a schematic representation of a side-gear worm in mesh with two sets of combination gears according to the invention in the same scale and meeting the same specifications as the prior art gearing in FIG. 8, but shown in correct 180° spacing to indicate the size reduction resulting from the greater working depth of the meshing teeth, the closed end design of the worm teeth, and the deeper hourglass shape of the worm-wheel portion of the combination gears.

FIGS. 10 and 11 are, respectively, side and end views of schematic representations of a prior art side-gear worm having closed-end teeth being cut by a straight-sided hob, with FIG. 11 including a representation of a mating combination gear.

FIGS. 12 and 13 are, respectively, side and end views of schematic representations in the same scale as FIGS. 10 and 11, but showing a side-gear worm according to a preferred embodiment of the invention, the side-gear worm having closed-end teeth being cut by a hob having involute teeth and having the same dimensions as the worm-wheel portion of a mating combination gear, and the side-gear worm also having significantly reduced diameter and cylindrical length dimensions.

Figure 14:
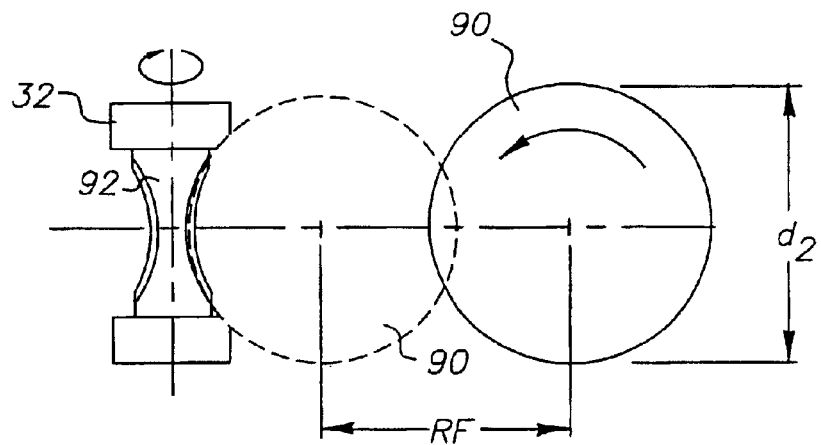

FIG. 14 is a schematic representation in the same scale as FIGS. 12 and 13 showing the involute teeth on the worm-wheel portion of a combination gear according to the invention being cut by a straight-sided hob having the same diameter as the smaller side-gear worm represented in FIGS. 12 and 13.

Figure 15:
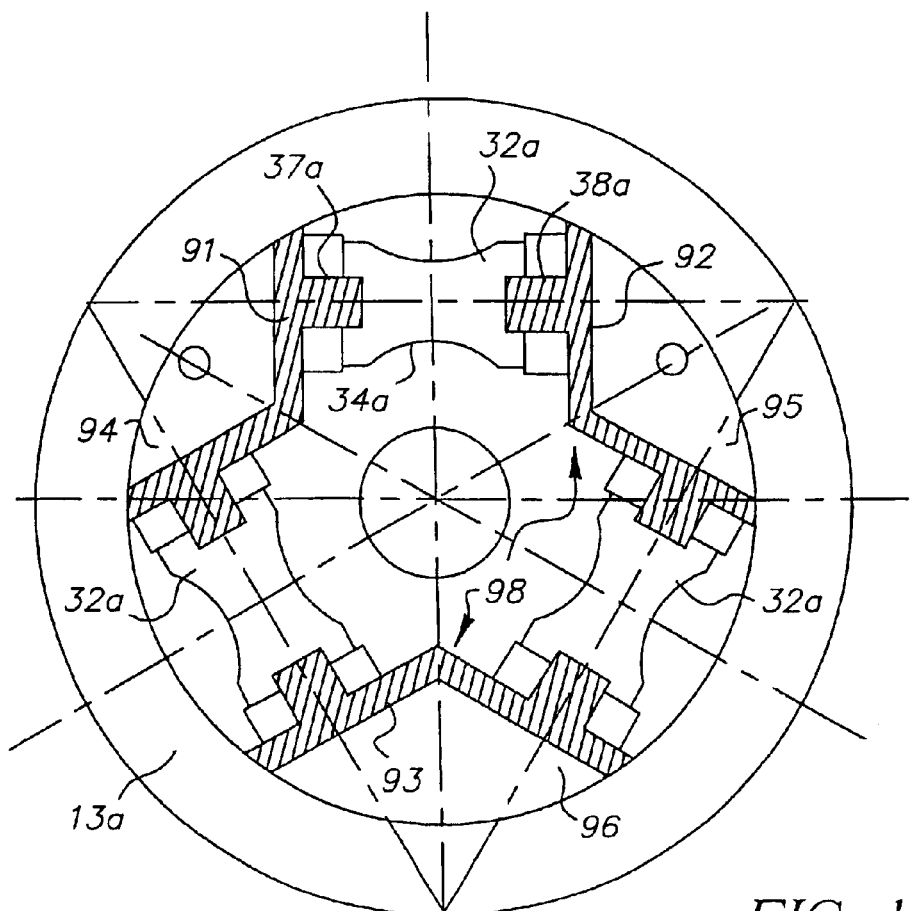

FIG. 15 is a schematic view of still another preferred embodiment of a full-traction differential with the end cap and, for clarity, the side-gear worms removed, showing combination gears according to the invention in a more conventional three-pair configuration.

Figure 16A:
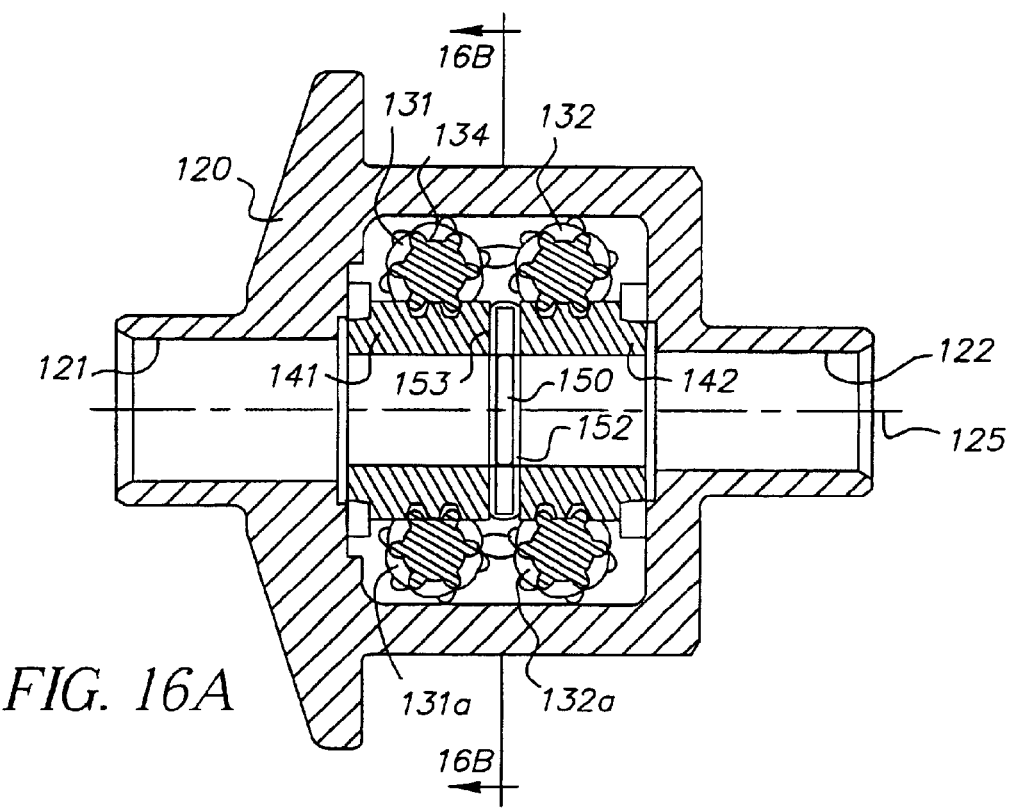
Figure 16B:
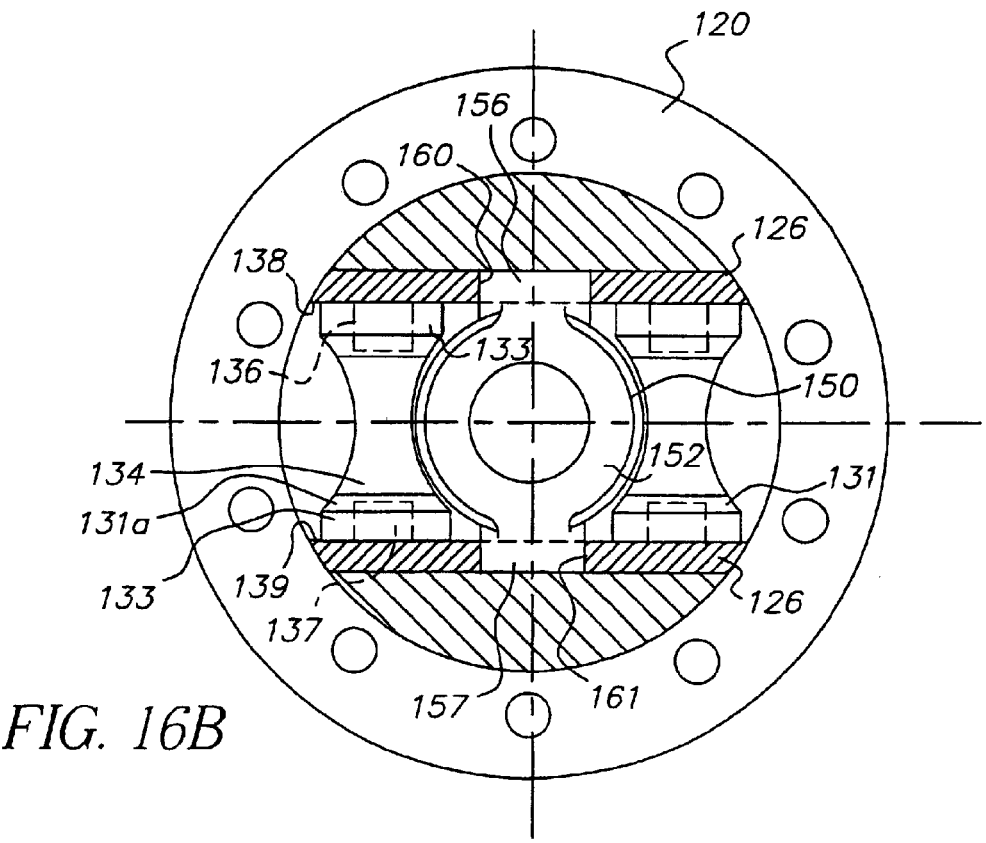

FIGS. 16A and 16B are schematic cross sections of a differential including a complete worm/worm-wheel gear complex according to the invention incorporated within a one-piece housing, FIG. 16A showing the thrust plate of FIG. 17 in side view, and FIG. 16B, taken in the plane B—B of FIG. 16A, showing the thrust plate in front view as received and maintained in place by the same opposed mounting plates that support the combination gears.

Figure 17A:
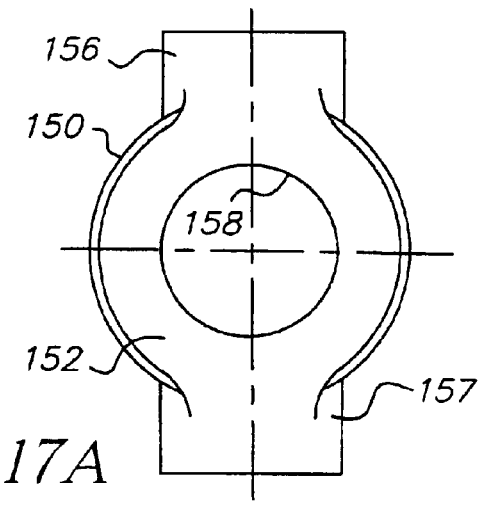
Figure 17B:
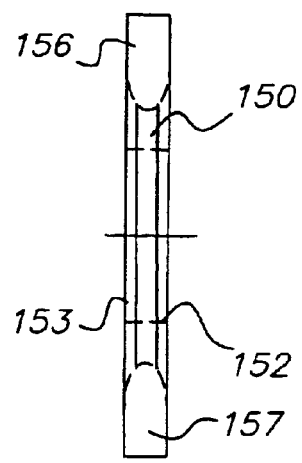
Figure 17C:
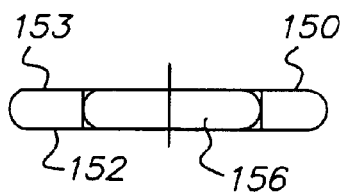
Figure 18:
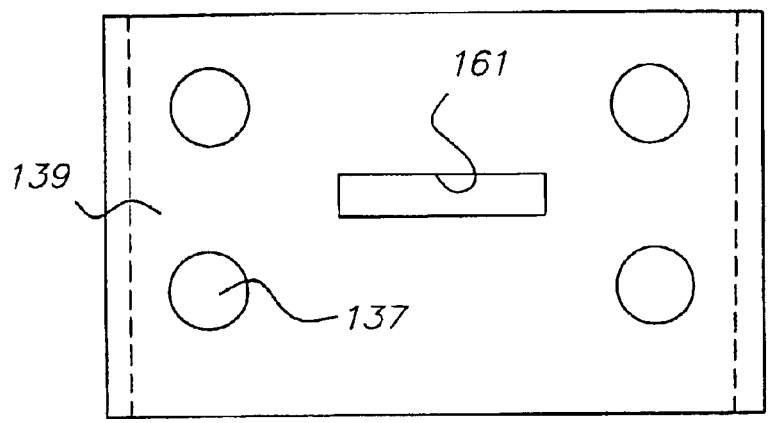

FIGS. 17A, 17B, and 17C are, respectively, front, side, and top views of a thrust plate that is positioned between the differential's side-gear worms, being received and maintained in place by the invention's identical opposed mounting plates, one of which is illustrated in FIG. 18.

FIG. 18 is a schematic view of the inner side of one of the pair of the invention's preferred identical mounting plates (similar to those illustrated in FIGS. 2 and 4), showing a slot for receiving and holding one of the respective tab ends of either of the thrust plates illustrated in FIG. 17 or 20.

Figure 19:
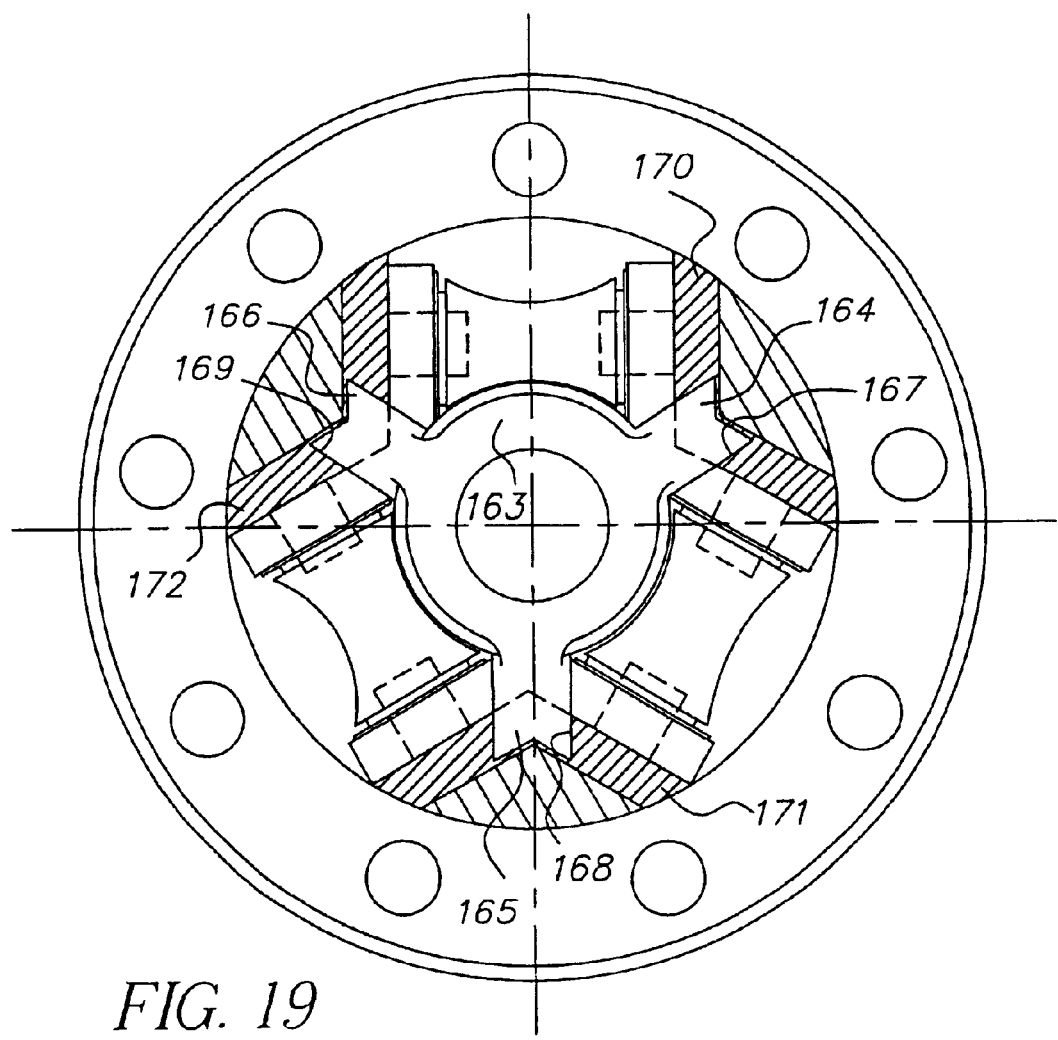

FIG. 19 is a schematic cross-sectional view of another preferred full-traction three-pair differential (similar to that illustrated in FIG. 15), the view being taken along a plane between the side-gear worms and showing a thrust plate similar to the thrust plate shown in FIGS. 17 but including, instead, three mounting tabs for being received and maintained in place, respectively, by each of three identical combined mounting plates.

Figure 20A:
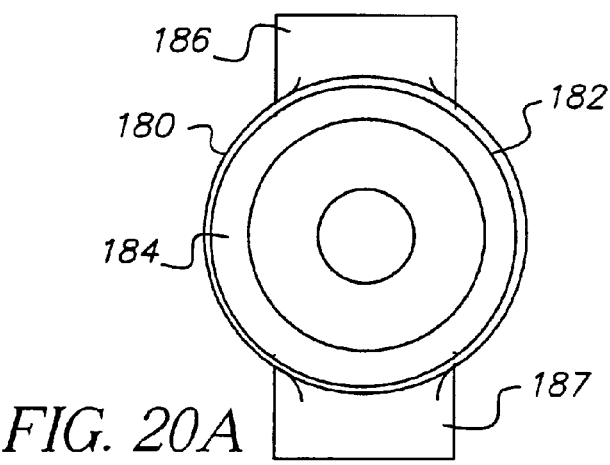
Figure 20B:
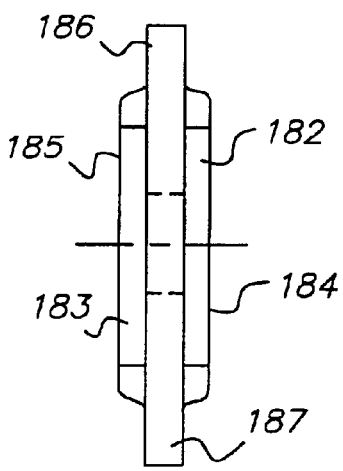
Figure 20C:
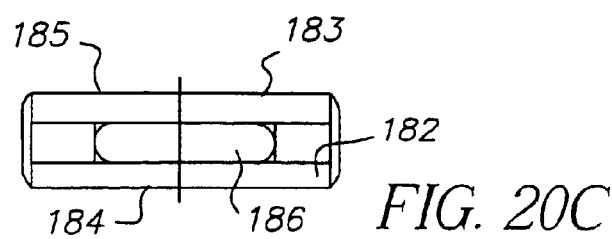

FIGS. 20A, 20B, and 20C are, respectively, schematic front, side, and top views of a thrust plate that, while similar to the thrust plate shown in FIG. 17 and similarly capable of being received and maintained in place by the mounting plate illustrated in FIG. 18, includes respective collars for piloting the inner ends of the differential's side-gear worms.

Figure 21A:
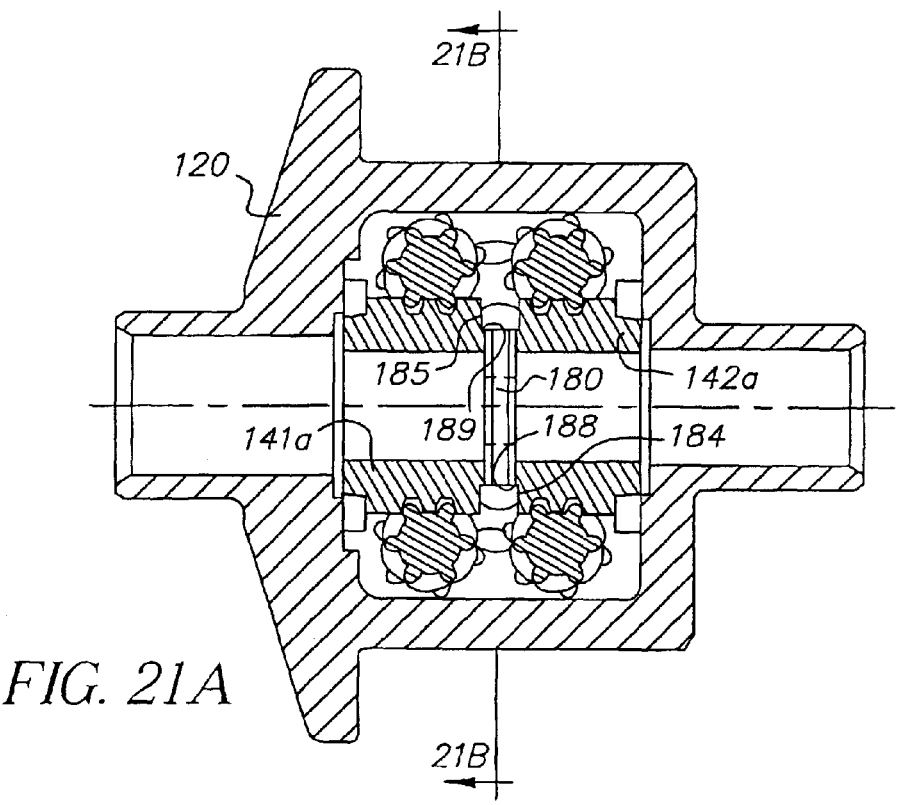
Figure 21B:
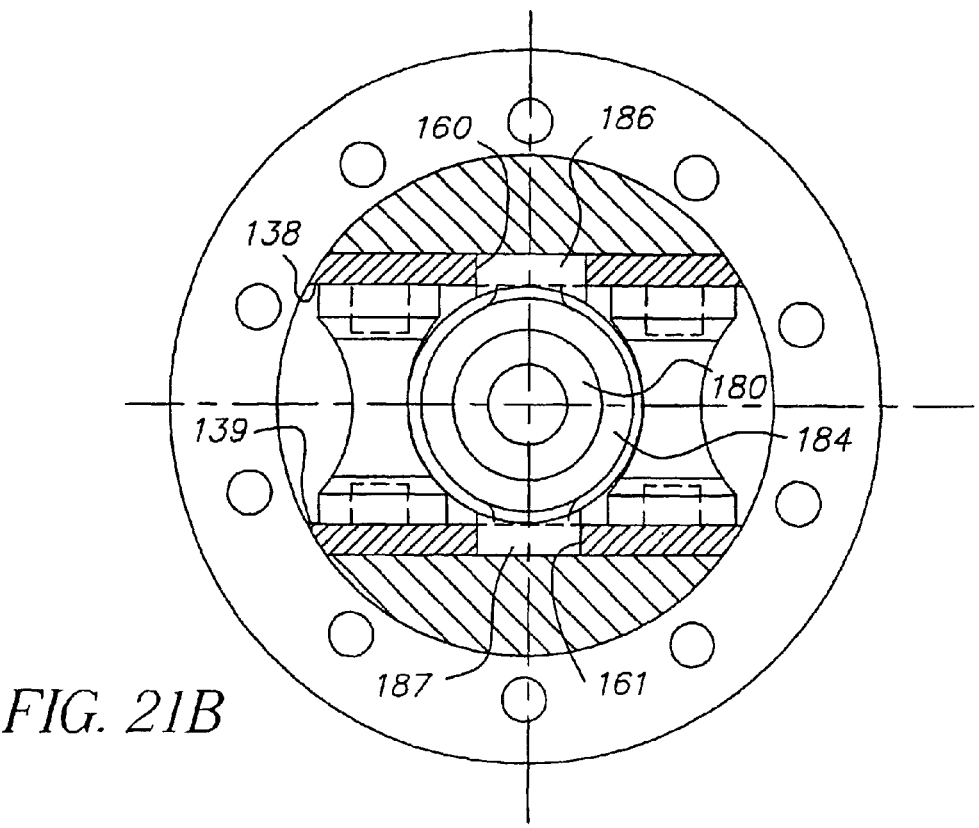

FIGS. 21A and 21B are further schematic cross sections of the differential shown in FIGS. 16A and 16B, substituting, instead, the thrust plate of FIG. 20 and providing shoulders on the side-gear worms for mating engagement with the piloting collars formed in the thrust plate.

DETAILED DESCRIPTION

As indicated above, while the various synergistic features of the invention are all related, it is believed that understanding is best facilitated by the following explanations that, generally, consider them individually. Also, it will be appreciated by those skilled in the art that the schematic drawings that are referenced below do not include either (a) the many minor crevices and channels that must be included to assure proper flow of lubrication fluids in and around the various disclosed parts of the gear complex and housing, or (b) commonly used anti-friction surfaces, mounting washers, etc.

Gear-Complex Mounting Structure

Figure 2:
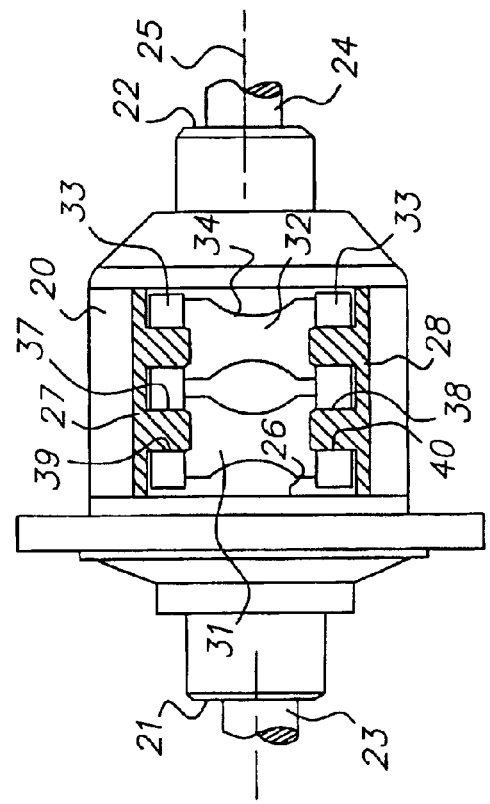
FIG. 2 is a schematic partially cross-sectioned side view of a full-traction differential according to the invention in the same scale as FIG. 1, but omitting the side-gear worms to increase clarity of the partially cross-sectioned mounting and combination gears.

Referring to FIG. 2, the first feature of the invention is shown in a preferred embodiment that has a one-piece housing 20 with a first set of appropriate openings 21, 22 for receiving the respective inner ends of output axles 23, 24 along an output axis 25. Each inner end of axles 23, 24 is fixed to a respective side-gear worm (not shown in FIG. 2) in the well-known manner as shown and explained in the Background portion above. Housing 20 has only a single further opening 26 that is rectangular in shape and extends directly through housing 20 perpendicular to axis 25.

For this embodiment, a pair of preferred mounting plates 27, 28 are received within rectangular opening 26 for supporting just two sets of paired combination gears centered, respectively, at 180° intervals about the cylindrical circumferences of the side-gear worms (only paired combination gears 31, 32 are shown). In the manner well known in the art, each combination gear has spur gear portions 33 spaced apart from a worm-wheel portion 34, spur gear portions 33 of each combination gear pair being in mating engagement with each other, while worm-wheel portion 34 of each combination gear is in mating engagement, respectively, with a respective one of the differential's side-gear worms (again, not shown in FIG. 2 but schematically illustrated in FIG. 9).

Fixed to mounting plates 27, 28 is a plurality of sets of paired hubs 37, 38 that extend axially into mating journal holes 39, 40 formed in the ends of each paired combination gear 31, 32. Mounting plates 27, 28 and the supported two sets of paired combination gears 31, 32 are all piloted within one-piece housing 20 on the side-gear worms that, as explained above, are fixed to the inner ends of axles 23, 24. Journal holes 39, 40 are not through holes but rather are manufactured with only a depth sufficient to receive hubs 37, 38. Thus, the central worm-wheel portion 34 of each combination gear 31, 32 is solid.

Figure 1:
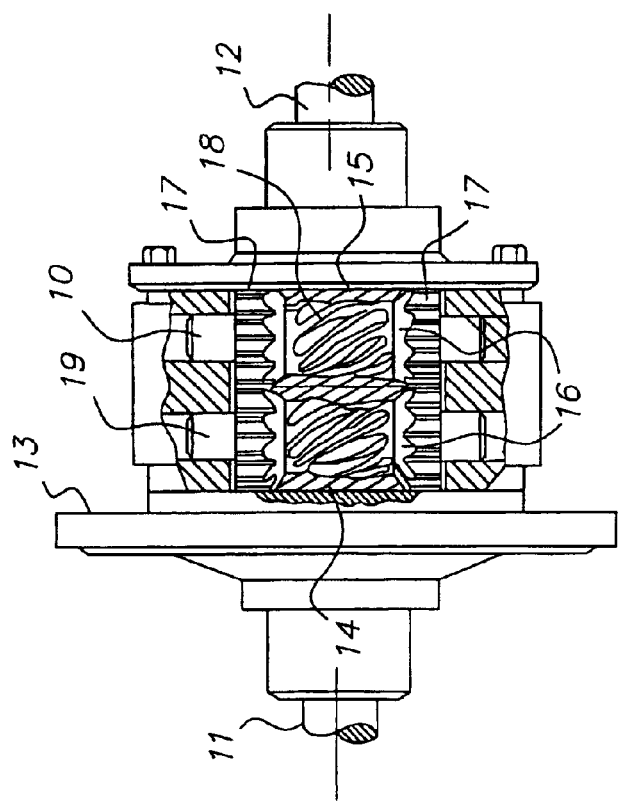
FIG. 1 is a partially cross-sectioned side view of a prior art full-traction differential.

To illustrate the significant space savings afforded by this first feature of the invention, a comparison is made between the prior art and the just-described mounting in the slightly enlarged schematic views shown in FIGS. 3 and 4. In both of these views, it is assumed that the combination gears and side gears have exactly the same specifications and gearing with identical working diameters and teeth, and the housings are designed for carrying the same loads. Referring first to FIG. 3, a pair of prior art combination gears 16 is mounted in mesh with a side gear 15, and each combination gear has either a pair of mounting hubs or a mounting shaft 19. A pair of housing segments 43, 44 are fixed to a ring gear mount 13 (not shown in FIG. 3 but see 16. FIG. 1) and have a respective thickness $S_1$ appropriate to carry the torque load of the differential. The housing in FIG. 3 has a diameter $D_1$.

In FIG. 4, the prior art differential of FIG. 3 has been modified only according to the first feature of the invention, namely, the only difference is the reversal of the structure for supporting the combination gears. Instead of mounting hubs or a mounting shaft, in FIG. 4 each combination gear 31, 32 is provided with a respective set of relatively shallow journal holes 39, 40 for receiving paired hubs 37, 38 fixed to, and extending inwardly from, mounting plates 27, 28. Again, a pair of housing segments 45, 46 are fixed to a ring gear mount (not shown) and have the same respective thickness $S_1$ as load-carrying segments 43, 44 of FIG. 3. However, it should be noted that the diameter of the housing has been reduced to $D_2$ without sacrificing the load-carrying ability of the differential.

Worm/Worm-Wheel Tooth Design

The remaining features of the invention also relate to the gear complex of the differential and, while resulting in further size reduction, also reduce weight and increase efficiency.

In prior art full-traction differentials, the worm/worm-wheel pairs of the crossed-axis compound planetary gear complex have been manufactured with involute-shaped teeth. FIG. 5 schematically represents a segmental side view cross section of prior art side-gear worm 15, showing its involute-shaped worm teeth 51 being cut by a traditional straight-sided hob 52. In FIG. 6, involute-shaped worm teeth 51 of prior art side-gear worm 15 are shown in mesh with the involute-shaped teeth 53 of mating combination gear 16. Points 55 indicate the location of the lines of contact shared by the meshing teeth. As indicated in the Background section above, this line contact, when combined with the screw-like relative motion of the worm/worm-wheel mesh, tends to squeeze lubricant off tooth surfaces and, therefore, necessitates the use of fairly viscous lubricants to prevent galling.

The next described features of the invention comprise a combination of modifications of these worm/worm-wheel pairs. The first modification is illustrated schematically and in a segmental side view cross section in FIG. 7. A modified side-gear worm 57 is cut with an involute-sided hob 53 producing teeth 59 having, in effect, an "inverse-involute" shape. Persons skilled in the art will appreciate that FIG. 7 also represents the resulting modified mesh between inverse-involute teeth 59 and the involute-sided teeth 53 of the mating worm-wheel portion of a modified combination gear 32.

As can be readily understood by a comparison of FIGS. 6 and 7, the line contact of the prior art is replaced with a "supra-enveloping" contact pattern 60 on only the drive side of the mesh. That is, the supra-enveloping contact of this modified tooth spreads the load over a relatively much larger area and, since the load is no longer concentrated along just lines of contact, increases part life while permitting the use of lower viscosity lubricants.

The next modification to the worm/worm-wheel pairs comprises the formation of "boxed" or "closed end" teeth on the worm. Such closed-end gear teeth are known, generally resulting in an increase in the strength of the teeth by permitting the teeth to be designed with greater working depth without loss of load-carrying ability. Referring to FIG. 8, prior art side-gear worm 15 is schematically represented as having traditional open-ended worm teeth 62 extending above the root circle 63, indicating the bottom of the tooth spaces in a cross section. In contrast, FIG. 9 schematically represents a side-gear worm 57 having, in accordance with the invention, closed-end worm teeth. Since the teeth are closed-end, they are not visible in the side view which does, however, again show the root circle 64 of the worm teeth of gear 57.

As just indicated above, closed-end teeth are known, and FIGS. 10 and 11 indicate how a prior art side-gear worm 66 might be cut with closed ends. FIG. 10 shows side-gear worm 66 being cut by the perpendicular feed PF of a straight-sided hob 52 (see also FIG. 5), the feed being perpendicular to the axis 67 of side-gear worm 66. The depth of the cut determines the depth of the root circle 68 of the worm teeth. The diameter $dh_1$ of hob 52 is selected so that, for the desired root circle 68, as hob 52 moves through its cutting cycle, the outer circumference 69 of hob 52 does not break the side surfaces 70, 71 of side-gear worm 66.

Superimposed in phantom lines over prior art side-gear worm 66 in FIG. 11 are the outer circumference 72 and the root circle 73 of the worm-wheel portion 32 of a mating prior art combination gear. In addition, FIGS. 10 and 11 identify the outside diameter $d_c$ of worm-wheel portion 32, the approximate working depth wd of the mating teeth of this prior art worm/worm-wheel combination, as well as the diameter $d_1$ and the axial length $a_1$ of prior art side-gear worm 66.

Still another modification to the invention's worm/worm-wheel pairs is the significant reduction in size of the side-gear worm, as illustrated in FIGS. 12 and 13 (which are drawn in the same scale as FIGS. 10 and 11). This modification begins with selection of a hob 80 with involute-shaped teeth 53 (see FIG. 7) and having an outside diameter $dh_2$ equivalent to the outside diameter $d_c$ of worm-wheel portion 32 of a mating prior art combination gear. Hob 80 cuts inverse-involute teeth having a working depth wd of the worm-wheel portion 32 of a mating prior art combination gear. As indicated in FIG. 13, a blank for side-gear worm 81 is provided with an axial length $a_2$ so that, when at full depth, the outer circumference 82 of hob 80 does not break the side surfaces 83, 84 of side-gear worm 81.

The supra-enveloping mesh between inverse-involute teeth 59 of side-gear worm 81 and the involute-sided teeth 53 of a mating worm-wheel portion of a combination gear 32 (as already explained above with reference to FIG. 7), when combined with closed ends of side-gear worm 81, creates stronger teeth that permit a reduction in the size of the side-gear worm without affecting the load-carrying ability of the differential. Therefore, the result is not only a significant reduction in the axial length of side-gear worm 81 (compare the length $a_2$ of FIG. 13 to the length $a_1$ of FIG. 11), but also a significant reduction in the diameter of side-gear worm 81 (compare the diameter $d_2$ of FIG. 12 to the diameter $d_1$ of FIG. 10).

The invention's final modification to the worm/worm-wheel pairs is a further reduction in the maximum overall dimension of the meshing pairs as illustrated in FIG. 14 (which is drawn in the same scale as FIGS. 8 and 9). The cutting of the teeth in the worm-wheel portion 92 of a combination gear 32 is accomplished with the radial feed RF of a straight-sided hob 90. While such relative hob motion is already known in the art, the illustrated modification selects a hob having a diameter $d_2$ equivalent to the reduced diameter of the invention's side-gear worm 81 of FIG. 13.

This just-described hobbing operation produces a combination gear with a deeper hourglass shape than heretofore used in the prior art and, when combined with the smaller diameter of the side-gear worm, results in a significant reduction in the maximum overall dimension of the meshing pairs. Reference is made once again to FIGS. 8 and 9. In the schematic representation of FIG. 8, a prior art side-gear worm is shown in mesh with three sets of combination gears; but only two sets of combination gears are shown, one of the sets being rotated to a 180° spacing for clarity and comparison. FIG. 9 is a similar schematic representation of a side-gear worm in mesh with two sets of combination gears according to the invention. However, as indicated above, the two sets shown in FIG. 9 are in the correct 180° spacing of a preferred embodiment of the invention. FIGS. 8 and 9 are drawn to the same scale, and the gears in both structures are capable of meeting the same specifications.

Attention is now called to the difference between the overall dimension $X_1$ of the prior art structure of FIG. 8 and the overall dimension $X_2$ of the invention's structure in FIG. 9. This significant reduction in overall dimension is the result of the invention's just-described modifications to the worm/worm-wheel pairs, namely, the smaller diameter of the side-gear worms made possible by the greater relative working depth of the meshing teeth arising from the combination of the supra-enveloping tooth contact coupled with the closed end design of the worm teeth, as well as the deeper hourglass shape of the worm-wheel portion of the combination gears.

As indicated above, one of the salient features of the crossed-axis gear complex of high-traction differentials is the mechanical advantage resulting from the worm/worm-wheel combination in the gear train between the vehicle's wheels and the differential. It is important to design this worm/worm-wheel combination so that it assures both (a) high enough traction to meet stringent poor-traction road conditions and (b) relatively easy initiation of differentiation. To this end, the preferred combination for the worm/worm-wheel teeth of this invention is 35°/55°. While this is not quite enough bias to cause a vehicle to be driven off when one wheel is jacked-up off the ground, it is enough to transfer the torque to the other drive wheel when a slight braking is applied to the wheel in the air. Therefore, it should be appreciated by those skilled in the art that this feature is particularly appropriate for use in combination with ABS (automatic braking systems) using traction controls.

3-Pair Embodiment

FIG. 15 shows an end view of three combination gears 32a, made according to the invention in the manner explained above, each gear 32a having a paired combination gear 31a (which cannot be seen in this drawing) in the manner as explained above with reference to FIG. 2. However, instead of just two pairs of combination gears mounted on 180° center intervals, FIG. 15 shows three pairs of combination gears mounted on more conventional 120° center intervals.

In this three-pair embodiment, each pair of combination gears 31a, 32a is rotatably supported by hubs extending from a respective pair of mounting plates similar to those described above. However, the internal edge of each mounting plate (identified by reference numeral 98) is connected, respectively, to a contiguous internal edge of a different mounting plate from another mounting plate pair. These connections between the contiguous edges of opposed mounting plates form, in effect, only three combined mounting plates 91, 92, 93, each of which has (a) a convex interior surface from which respective hubs 37a, 38a extend and (b) a concave exterior surface that mates with a respective convex interior surface of one of three plate support segments 94, 95, 96 that are fixed to a flange 13a for holding a ring gear (not shown) in the manner well known in the art.

The connected contiguous internal edges 98 of each combined mounting plate 91, 92, 93 meet at an angle of 120°; and, in this preferred embodiment, each plate support segment 94, 95, 96 is provided with a mating interior convex surface also formed at an angle of 120°.

In the manner described above, the worm-wheel portion 34a of each combination gear 32a of this three-pair embodiment is in mating engagement, respectively, with a respective one of the differential's side-gear worms. Again, while this mating engagement is not shown in FIG. 15, it is similar to the engagement schematically illustrated in FIG. 9.

As in the preferred embodiments of the invention already described above, the preferred three-pair embodiments also include the above-described "supra-enveloping" contact pattern in the mesh between the inverse-involute teeth of each side-gear worm and the involute-sided teeth of the mating worm-wheel portions of the three combination gears associated with each side-gear worm.

Torque-Balancing Thrust Plate

The next feature of the invention relates to overcoming the torque imbalance of prior art high-traction differentials that results from the transfer of end thrust between the side-gear worms, as noted and explained earlier. Reference is now made to FIGS. 16A and 16B that show a differential incorporating a complete worm/worm-wheel gear complex according to the invention. Housing 120 is formed, preferably, in one piece from powder metal and has only three openings. Namely, a first set of appropriate openings 121, 122 is aligned along a first axis 125 for receiving the respective inner ends of output axles (not shown); and only a single further opening 126, which is rectangular in shape and extends directly through housing 120, is centered perpendicular to axis 125.

Two pair of combination gears 131, 132 and 131a, 132a each have respective spur gear portions 133 separated by an hour-glass shaped worm-wheel portion 134 that are designed and manufactured as described above. The respective spur gear portions 133 of each pair are in mesh with each other, and all of these combination gears are rotatably supported on sets of paired hubs 136, 137 that are formed integrally with an opposing pair of mounting plates 138, 139 (similar to those shown in FIGS. 2 and 4 and described above). The respective worm-wheel portions 134 of combination gear pair 131, 132 are in mesh with respective ones of a pair of side-gear worms 141, 142, while the respective worm-wheel portions 134 of combination gear pair 131a, 132a are similarly in mesh with, respectively, the same pair of side-gear worms 141, 142.

Positioned intermediate the inner ends of side-gear worms 141, 142 is a thrust plate 150 that is illustrated in three views in FIGS. 17A, 17B, and 17C. Thrust plate 150 includes respective bearing surfaces 152, 153, mounting tabs 156, 157, and a weight-saving lubrication opening 158. Mounting tabs 156, 157 are designed to mate with slots 160, 161 formed centrally in identical mounting plates 138, 139, the latter being illustrated in FIG. 18. Slots 160, 161 not only position thrust plate 150 intermediate the inner ends of side-gear worms 141, 142 but also prevent lateral movement of thrust plate 150. Therefore, referring specifically to FIG. 16A, when driving torque applied to side-gear worms 141, 142 results in thrust to the left, worm 142 moves against fixed bearing surface 152 of thrust plate 150, while worm 141 moves away from fixed bearing surface. 153 of thrust plate 150 and against housing 120 (or against appropriate washers positioned conventionally between worm 141 and housing 120). The resulting friction against the rotation of worm 141 is unaffected by the thrust forces acting on worm 142. Similarly, when driving torque applied to side-gear worms 141, 142 results in thrust to the right, worm 141 moves against fixed bearing surface 153 of thrust plate 150, while worm, 142 moves away from fixed bearing surface 152 of thrust plate 150 and against housing 120 (or, again, against appropriate washers positioned conventionally between worm 142 and housing 120). Similarly, the resulting friction against the rotation of worm 142 is unaffected by the thrust forces acting on worm 141. Thus, regardless of the direction of the driving torque, the friction acting against the rotation of each side-gear worm is not affected by the thrust forces acting on the other side-gear worm. Since the torque bias of the differential is affected by frictional forces, this prevention of additive thrust forces helps to minimize torque imbalance, i.e., differences in torque during different directions of vehicle turning.

In FIG. 19, another preferred full-traction three-pair differential (similar to that illustrated in FIG. 15) is shown in a schematic cross-sectional view taken along a plane between the side-gear worms. This drawing shows a thrust plate 163 that, while similar to thrust plate 150 just described above, includes, instead, three mounting tabs 164, 165, 166, each being received and maintained in place, respectively, by slots 167, 168, 169, the latter being formed, respectively, in each of three identical combined mounting plates 170, 171, 172. The function of thrust plate 163 is exactly the same as that just explained above in regard to thrust plate 150 (FIG. 17). Namely, although the side-gear worms cannot be seen in. FIG. 19, those skilled in the art will appreciate that thrust plate 163 prevents lateral thrust forces acting on one side-gear worm from being added to the other side-gear worm. Thus, thrust plate 163 similarly acts to minimize differences in torque bias during different directions of vehicle turning.

Piloting of Side-Gear Worms

In some vehicles, the drive axles are only supported in bearings at their wheel ends. Therefore, their inner ends must be supported and piloted by the differential. The following feature of the invention makes it possible to accommodate such axles.

Reference is now made to FIGS. 20A, 20B, and 20C as well as to FIGS. 21A and 21B. These drawings show another variation of thrust plate 150 mounted in the same differential housing and gear complex as already described with regard to FIGS. 16A and 16B. The primary difference is that, in these just-cited drawings, a different thrust plate 180 has been substituted. As can most easily be seen in FIGS. 20, thrust plate 180 includes a pair of collars 182, 183 that each include a respective bearing surface 184, 185. Thrust plate 180 also includes a pair of mounting tabs 186, 187 that are also designed to mate with slots 160, 161 formed centrally in identical mounting plates 138, 139 (the latter being illustrated in FIG. 18 just as explained above).

The only other difference in the differential housing and gear complex shown in FIGS. 21A and 21B is that the side-gear worms 141a, 142a now include, respectively, shoulders 188, 189 that mate, again respectively, with collars 182 and 183 of thrust plate 180. Bearing surfaces 184, 185 support the circumference of the inner ends of side-gear worms 141a, 142a. Thus, since thrust plate 180 is held securely in place in the center of differential housing 120 by mounting plates 138, 139, collars 182, 183 serve to pilot the inner ends of the vehicle's axles. This arrangement also relieves some of the load that the axles may place on the axle bearing surfaces of one-piece housing 120.

As indicated earlier, each of the above-described basic structural and design features of the invention by itself provides some improvement in efficiency and some reduction in size and weight when compared with prior art full-traction differentials having similar load-carrying specifications. However, when all of the features of the invention are combined in a single differential, they result in a synergism that permits the same automotive load-carrying specifications for full-traction to be met more efficiently in a remarkably compact differential housing that is smaller in both size and weight without sacrificing either durability or strength. Also, the synergism of the invention can be used to great advantage in gear complexes designed for differential use in front and rear axles as well as in center boxes and transfer cases.

We claim:

1. A gear complex in a full-traction differential transferring rotational forces from an external power source to a pair of output axles mounted on an output axis, said differential having a housing that receives one end of each respective axle and is rotationally driven by said external power source; said gear complex, being supported within and rotating with said housing, comprising:

a pair of side-gear worms, each side gear being mounted for rotation about said output axis and fixed to a respective one of said output axles;

at least two sets of paired combination gears, each combination gear of each pair having (a) an axis of rotation that is substantially perpendicular to said output axis, (b) a solid gear body with only a shallow journal hole formed axially a predetermined distance into each end thereof, and (c) a first gear portion spaced apart from a worm-wheel portion, said first gear portions of said combination gear pair being in mating engagement with each other, and said worm-wheel portions of said combination gear pair being in mating engagement, respectively, with a respective one of said side-gear worms; and a mounting for supporting said sets of paired combination gears, said mounting having a plurality of sets of paired hubs fixed to said mounting and positioned, respectively, to extend axially into said shallow journal holes formed in the ends of each paired combination gear.

2. The differential of claim 1 wherein said mounting comprises at least one pair of opposed mounting plates and said paired hubs extend from the interior surface of each respective opposed mounting plate.

3. The differential of claim 1 wherein said worm-wheel teeth of each said respective combination gear have involute teeth and said side-gear worms have inverse-involute teeth with closed ends, and said involute worm-wheel teeth and said inverse-involute worm teeth, when in meshing engagement, share a supra-enveloping contact pattern.

4. The differential of claim 1 further comprising a thrust plate received by said mounting and maintained in a fixed position between the inner ends of said pair of side-gear worms.

5. In a full-traction differential that transfers rotational forces from an external power source to a pair of side-gear worms in a gear complex supported in a housing rotationally driven by said external power source, said side-gear worms rotating about a first axis and each side-gear worm being fixed to a respective one of two output axles received in said housing; said gear complex having, in addition to said side-gear worms, at least two sets of paired combination gears, each combination gear of each pair being mounted for rotation about an axis substantially perpendicular to said first axis, and each combination gear having a spur gear portion spaced apart from a worm-wheel portion and being in mating engagement with the other combination gear of said pair through said spur gear portion and in mating engagement with a respective one of said side-gear worms through said worm-wheel portion, the improvement wherein:

said gear complex comprises at least one of:

(a) a mounting with a plurality of pairs of hubs for supporting said combination gears, the individual hubs of each said pair extending, respectively, into mating shallow journal holes formed axially in each end of an otherwise solid body of each combination gear; and (b) each said side-gear worm having inverse-involute teeth with closed ends, and each worm-wheel portion of each said combination gear having involute teeth.

6. The differential of claim 5 wherein said inverse-involute teeth of said side-gear worms, when in meshing engagement with said involute worm-wheel teeth of each said respective mating combination gear, share a supra-enveloping contact pattern.

7. The differential of claim 5 wherein said side-gear worms with closed end teeth are cut with a face hob that has the same outside diameter as the worm-wheel portion of each said combination gear.

8. The differential of claim 5 wherein said combination gears comprise only two paired sets, each said set being spaced for rotation with said housing at an interval of 180° from the other said set.

9. The differential of claim 8 wherein said housing is manufactured in one piece and further comprises:
   a first set of two openings for receiving said respective output axles along said first axis; and
   only a single further opening that extends directly through said housing, being centered along a second axis perpendicular to said first axis, said single further opening receiving said mounting for supporting said combination gears.

10. The differential of claim 5 wherein said housing is provided with structure for receiving and holding said mounting within said housing for rotation therewith, and wherein said mounting comprises at least one pair of opposed mounting plates, said hubs extending from the interior surface of each respective opposed mounting plate.

11. The differential of claim 10 wherein said gear complex has, in addition to said side-gear worms, three sets of said paired combination gears, and wherein said mounting comprises, in effect, at least three pairs of opposed mounting plates centered, respectively, at intervals of 120°, and said paired hubs extend from the interior surface of each respective opposed mounting plate.

12. The differential of claim 11 wherein said housing has three plate support segments also centered at intervals of 120°, and each of said pairs of opposed mounting plates is positioned between two of said plate support segments.

13. The differential of claim 12 wherein:
   each plate of said three pairs of opposed mounting plates has an internal edge; and
   each internal edge of each mounting plate is proximate, respectively, to a contiguous internal edge of a different mounting plate from another of said pairs of opposed mounting plates.

14. The differential of claim 13 wherein:
   said contiguous internal edges of different mounting plates are connected to form three combined mounting plates, each said combined mounting plate having a convex interior surface and a concave exterior surface;
   said hubs extend from said convex interior surface of each said combined mounting plate;
   each said plate support segment of said housing has a convex interior surface; and
   each said concave exterior surface of each said combined mounting plate is supported by the convex interior surface of one of said plate support segments.

15. The differential of claim 14 further comprising a thrust plate having three tabs, each said tab being:
   centered, relative to said other tabs, at an angle of 120°;
   received by a respective mating slot formed in each said combined mounting plate; and
   maintained in a fixed position between the inner ends of said pair of side-gear worms.

16. The differential of claim 10 further comprising a thrust plate received by said pair of opposed mounting plates and maintained in a fixed position between the inner ends of said pair of side-gear worms.

17. The differential of claim 16 therein each said thrust plate includes a pair of tabs and each said opposed mounting plate includes a slot, a respective one of said tabs being received and maintained in a mating relationship with a slot of one of said opposed mounting plates.

18. A gear complex for use in a full-traction differential for transferring rotational forces from an external power source to a pair of output axles, said differential having a housing that receives one end of each respective axle and is rotationally driven by said external power source; said gear complex, being supported within and rotating with said housing, comprising:
   a pair of side-gear worms, each side gear:
      (a) being fixed to a respective one of said output axles; and
      (b) having inverse-involute teeth with closed ends;
   at least two sets of paired combination gears, each combination gear of each pair having:
      (a) a solid gear body with only a shallow journal hole formed axially a predetermined distance into each end thereof,
      (b) a first gear portion spaced apart from a worm-wheel portion, said first gear portions of said combination gear pair being in mating engagement with each other, and said worm-wheel portions of said combination gear pair being in mating engagement, respectively, with a respective one of said side-gear worms; and
      (c) said worm-wheel portion having involute teeth so that, when in meshing engagement with said inverse-involute worm teeth of said side-gear worms, said worm teeth and worm-wheel teeth share a supra-enveloping contact pattern;
   a mounting for supporting said sets of paired combination gears, said mounting having:
      (a) a plurality of sets of paired hubs fixed to said mounting and positioned, respectively, to extend axially into said shallow journal holes formed in the ends of each paired combination gear; and
      (b) a thrust plate maintained in a fixed position between the inner ends of said pair of side-gear worms.

* * * * *